United States Patent
Angeliu et al.

(10) Patent No.: US 12,372,190 B1
(45) Date of Patent: Jul. 29, 2025

(54) PIPE NAVIGATION APPARATUS WITH COLLAPSIBLE DRIVE ASSEMBLY

(71) Applicant: GE Infrastructure Technology LLC, Greenville, SC (US)

(72) Inventors: Katelyn Marie Angeliu, Schenectady, NY (US); Todd William Danko, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/862,659

(22) PCT Filed: Mar. 27, 2024

(86) PCT No.: PCT/US2024/021686
§ 371 (c)(1),
(2) Date: Nov. 4, 2024

(51) Int. Cl.
| | |
|---|---|
| *F16L 55/28* | (2006.01) |
| *F16L 55/30* | (2006.01) |
| *F16L 55/32* | (2006.01) |
| *F16L 55/34* | (2006.01) |
| *F16L 55/46* | (2006.01) |
| *F16L 101/30* | (2006.01) |

(52) U.S. Cl.
CPC ............... *F16L 55/28* (2013.01); *F16L 55/30* (2013.01); *F16L 55/32* (2013.01); *F16L 55/34* (2013.01); *F16L 55/46* (2013.01); *F16L 2101/30* (2013.01)

(58) Field of Classification Search
CPC ....... F16L 2101/30; F16L 55/32; F16L 55/30; F16L 55/34; F16L 55/18; F16L 55/28; F16L 55/44; F16L 55/26
USPC .......................................................... 104/138.2
See application file for complete search history.

(56) References Cited

U.S. PATENT DOCUMENTS

| | | | | |
|---|---|---|---|---|
| 3,525,111 A * | 8/1970 | Von Arx | ................. | B08B 9/051 |
| | | | | 15/104.061 |
| 11,560,977 B2 * | 1/2023 | Duncan | ................... | F16L 55/32 |
| 11,585,480 B2 * | 2/2023 | Duncan | ................... | F16L 55/30 |
| 11,598,474 B2 * | 3/2023 | Duncan | ................... | F16L 55/30 |
| 11,796,116 B2 * | 10/2023 | Duncan | ................... | F16L 55/30 |
| 11,841,105 B2 * | 12/2023 | Duncan | ................... | F16L 55/18 |
| 11,867,339 B2 * | 1/2024 | Danko | ................... | F16L 55/18 |
| 12,031,660 B2 * | 7/2024 | Duncan | ................... | F16L 55/30 |
| 12,111,006 B2 * | 10/2024 | Danko | ................... | F16L 55/18 |
| 12,163,616 B2 * | 12/2024 | Duncan | ................... | F16L 55/32 |
| 12,209,699 B2 * | 1/2025 | Danko | ................... | F16L 55/30 |

(Continued)

FOREIGN PATENT DOCUMENTS

| | | | | |
|---|---|---|---|---|
| EP | 0089738 A2 * | 9/1983 | .............. | F16L 55/00 |
| KR | 100855521 B1 | 9/2008 | | |

OTHER PUBLICATIONS

International Search Report and Written Opinions issued in PCT/US2024/021686 mailed on Oct. 8, 2024, pp. 25.

*Primary Examiner* — Zachary L Kuhfuss
(74) *Attorney, Agent, or Firm* — Armstrong Teasdale LLP (57) ABSTRACT

A navigation apparatus for use in navigating a pipe includes a body, a movable core coupled to the body by a sacrificial connector, and a drive assembly configured to engage an interior wall of the pipe to propel the navigation apparatus through the pipe. The drive assembly including a first arm, a second arm, and a wheel, wherein the first arm is pivotably coupled to the core and the wheel, and the second arm is pivotably coupled to the body and the wheel.

20 Claims, 6 Drawing Sheets

(56) References Cited

U.S. PATENT DOCUMENTS

| | | | |
|---|---|---|---|
| 2011/0011299 A1* | 1/2011 | Beck | B60B 19/003 |
| | | | 104/138.2 |
| 2017/0002970 A1* | 1/2017 | McKaigue | B08B 9/045 |
| 2021/0025533 A1* | 1/2021 | Duncan | F16L 55/30 |
| 2021/0025534 A1* | 1/2021 | Duncan | B08B 9/051 |
| 2021/0025535 A1* | 1/2021 | Duncan | F16L 55/48 |
| 2021/0025536 A1* | 1/2021 | Duncan | F16L 55/32 |
| 2021/0148503 A1 | 5/2021 | Fekrmandi et al. | |
| 2023/0220943 A1* | 7/2023 | Duncan | F16L 55/28 |
| | | | 73/865.8 |
| 2023/0228360 A1* | 7/2023 | Danko | F16L 55/32 |
| | | | 73/865.8 |
| 2023/0243455 A1* | 8/2023 | Duncan | G01N 21/954 |
| | | | 118/317 |
| 2023/0243456 A1* | 8/2023 | Danko | F16L 55/30 |
| | | | 29/402.19 |
| 2023/0243457 A1* | 8/2023 | Duncan | F16L 55/32 |
| | | | 138/97 |
| 2024/0093825 A1* | 3/2024 | Danko | F16L 55/18 |

\* cited by examiner

PIPE NAVIGATION APPARATUS WITH COLLAPSIBLE DRIVE ASSEMBLY

STATEMENT REGARDING FEDERALLY SPONSORED RESEARCH AND DEVELOPMENT

This invention was made with Government support under contract number DE-AR0001328 awarded by the Advanced Research Projects Agency-Energy (ARPA-E). The Government has certain rights in this invention.

CROSS REFERENCE TO RELATED APPLICATIONS

This application is a National Stage Entry of International Patent Application No. PCT/US2024/21686 filed on Mar. 27, 2024, the contents of which are hereby incorporated herein by reference in their entirety.

BACKGROUND

The field of the disclosure relates to systems for navigating pipes, and more particularly to pipe navigation apparatus including a collapsible drive assembly.

Pipes are commonly used to transport fluids. For example, typical pipes include a cylindrical sidewall that defines an interior cavity. During operation, fluids are transported within the interior cavity of the pipes. Sometimes, the fluids that are transported through the pipes have characteristics that can cause wear, deterioration, or otherwise affect the properties of the pipes. As a result, the pipes may require routine inspection and repair. At least some known apparatuses used for navigating a pipe include a crawler having wheels that exert an outward force (e.g., traction force) on the pipe to provide traction for driving the crawler, and any apparatuses or tether lines carried by the crawler, within the pipe. However, for at least some known crawlers, the outward force exerted by the crawler on the pipe provides resistance against retrieving the crawler in the event of a malfunction, such as a loss of power or communications with the crawler. To retrieve the crawler in the event of such malfunctions, the pipe is cut and/or excavated (when the pipe is below ground) to retrieve the crawler from the pipe.

Additionally, for some such crawlers, increased travel distance of the crawler into the pipe requires increased traction force by the crawler on the pipe to compensate for increased overall frictional loads by a tether towed by the crawler. The increased tractional forces make the crawler difficult to retrieve by external means in the event of a malfunction. As a result, such crawlers are not well suited for traveling relatively long distances in a pipe.

Accordingly, it would be desirable to provide a system for navigating pipes including a navigation apparatus that facilitates passively disengaging the crawler from the pipe in the event of a malfunction.

BRIEF DESCRIPTION

In one aspect, a navigation apparatus for use in navigating a pipe is provided. The navigation apparatus includes a body, a movable core coupled to the body by a sacrificial connector, and a drive assembly configured to engage an interior wall of the pipe to propel the navigation apparatus through the pipe. The drive assembly including a first arm, a second arm, and a wheel, wherein the first arm is pivotably coupled to the core and the wheel, and the second arm is pivotably coupled to the body and the wheel.

In another aspect a pipe navigation system for use in navigating a pipe is provided. The pipe navigation system includes a tether and a pipe navigation apparatus. The pipe navigation apparatus includes a body, wherein the tether is coupled to the body, a movable core coupled to the body by a sacrificial connector, and a drive assembly pivotably coupled to the body and the movable core. The drive assembly is configured to engage an interior wall of the pipe to propel the navigation apparatus through the pipe. The sacrificial connector is configured to break in response to a loading on the tether to disengage the drive assembly from the interior wall and collapse the drive assembly on the body.

In yet another aspect, a method for controlling a navigation apparatus in a pipe is provided. The method includes controlling a drive assembly of a navigation apparatus to engage an interior wall of the pipe. The navigation apparatus includes a body and a movable core coupled to the body by a sacrificial connector. The drive assembly is pivotably coupled to the core and the body. The method further includes loading a tether connected to the body to break the sacrificial connector and disengage the drive assembly from the interior wall of the pipe, and collapse the drive assembly on the body.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a pipe navigation system including a navigation apparatus having a collapsible drive assembly. The apparatus includes a body and a movable core coupled to the body by a sacrificial connector. The apparatus further includes a drive assembly configured to engage an interior wall of the pipe to propel the navigation apparatus through the pipe. The drive assembly includes a first arm, a second arm, and a wheel, where the first arm is pivotably connected to the core and the wheel, and the second arm is pivotably connected to the body and the wheel. A tether is coupled to the body when the navigation apparatus is in the pipe. The drive assembly is configured to collapse in response to breaking of the sacrificial connectors (e.g., due to loading the tether). The tether is loaded by increasing tension to the tether, such as by an operator pulling on the tether or through a separate mechanical tensioning means, such as a winch. As a result, the navigation apparatus allows for the drive assembly to be disengaged from the pipe by loading the tether outside of the pipe, in the event the navigation apparatus becomes obstructed or is otherwise made unresponsive. Thus, the navigation apparatus may be removed from the pipe when unresponsive, without needing to excavate to reach the portion of the pipe having the navigation apparatus. Additionally, the navigation apparatus may utilize a higher clamping force against the pipe, since the navigation apparatus may be passively collapsed in the event of a failure. The higher clamping force allows for the navigation apparatus to carry increased loads and/or travel further in the pipe relative to conventional navigation apparatuses.

Figure 1:
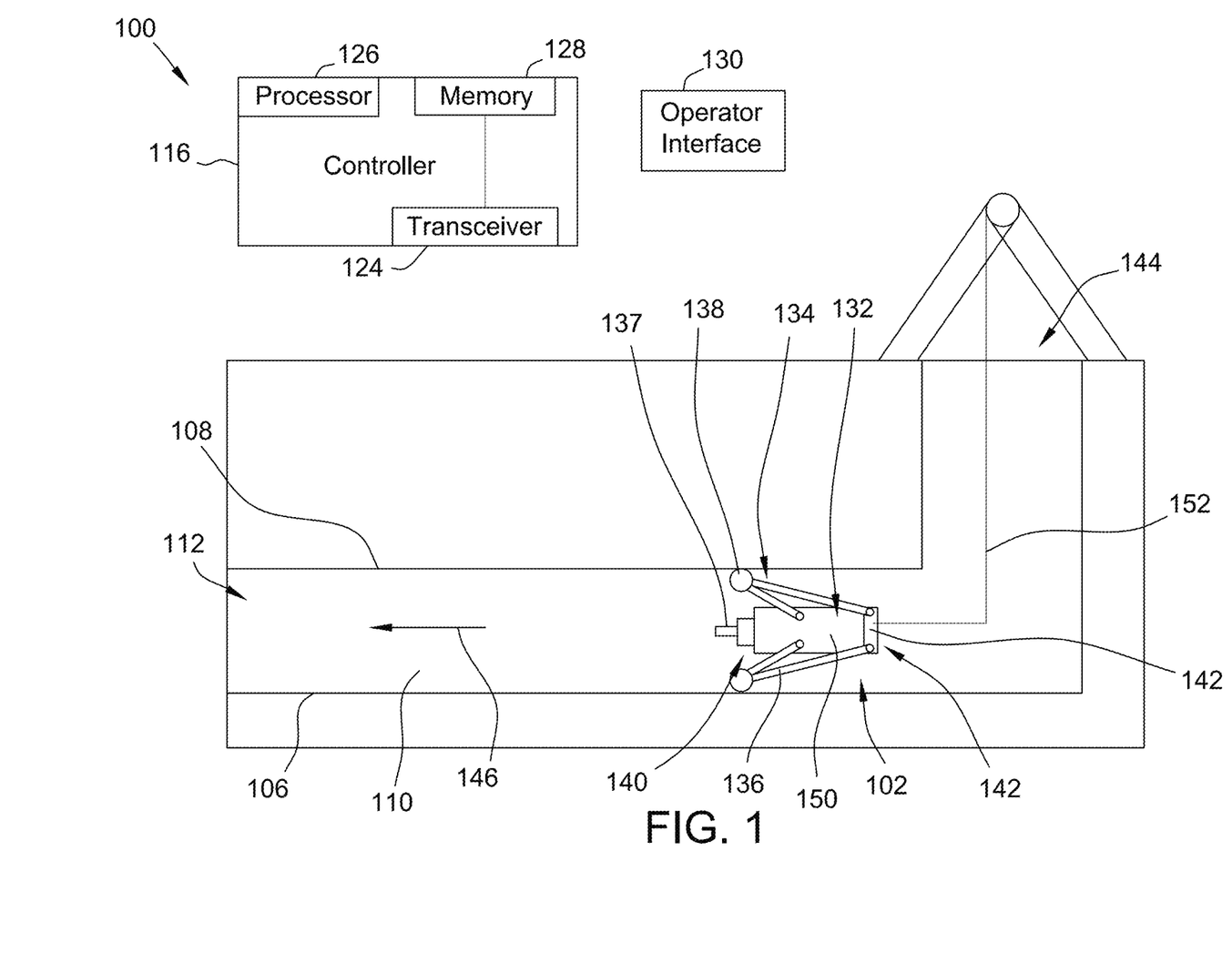
FIG. 1 is a schematic diagram of a pipe treatment system including a navigation apparatus traveling underground.

FIG. 1 is a schematic diagram of a pipe navigation system 100, alternatively referred to herein as a "system" including a navigation apparatus 102, also referred to herein as a "crawler," traveling underground. For example, navigation apparatus 102 is configured to travel through a pipe 106. Pipe 106 may be any enclosed path through a material. For example, pipe 106 may be a conduit or a tunnel and may have a circular or non-circular cross-section. Pipe 106 includes a sidewall 108 having an interior surface 110 defining an interior cavity 112.

System 100 includes a controller 116 communicatively coupled to navigation apparatus 102. In the example embodiment, controller 116 is configured to provide instructions to move navigation apparatus 102 through pipe 106 and/or to perform inspection or repair operations. Controller 116 includes a transceiver 124, a processor 126, and a memory 128. In some embodiments, controller 116 is positioned remotely from navigation apparatus 102, e.g., controller 116 is located at a base station that enables an operator on an exterior of pipe 106 (shown in FIG. 1) to interact with navigation apparatus 102, and/or controller 116 can be at least partly incorporated into and located on board navigation apparatus 102. Transceiver 124 is communicatively coupled with navigation apparatus 102 and is configured to send information to and receive information from a transceiver of navigation apparatus 102. In some embodiments, transceiver 124 and a transceiver on navigation apparatus 102 communicate wirelessly. In alternative embodiments, navigation apparatus 102 and controller 116 communicate in any manner that enables system 100 to operate as described herein. For example, in some embodiments, controller 116 and navigation apparatus 102 exchange information through a wired link extending between navigation apparatus 102 and controller 116 e.g., by a tether 152, described in further detail below.

In addition, in some embodiments, controller 116 is at least partly located on board navigation apparatus 102 and is configured to execute instructions for controlling components of navigation apparatus 102, such as a maintenance tool and drive systems. For example, controller 116 executes instructions that cause navigation apparatus 102 to move in a selected direction. In alternative embodiments, navigation apparatus 102 includes any controller that enables system 100 to operate as described herein. In some embodiments, controller 116 is not located on board navigation apparatus 102.

In some embodiments, navigation apparatus 102 includes one or more sensors. An operator interface 130 is configured to display information relating to the characteristics detected by navigation apparatus 102 for interpretation by the operator. Operator interface 130 may be included on a remote computing device (not shown) and/or may be incorporated with controller 116. Operator interface 130 may include, among other possibilities, a web browser and/or a client application. For example, in some embodiments, operator interface 130 displays images of interior surface 110 based on received signals. In some embodiments, operator interface 130 allows an operator to input and/or view information relating to control of navigation apparatus 102. In the example embodiment, operator interface 130 is configured to display information relating to the state of one or more of a maintenance tool and a power source for interpretation by the operator. For example, state information may include a position of navigation apparatus 102 along a length of pipe 106.

In various embodiments, processor 126 translates operator inputs into steering, tool motion, camera control, sensor control, sensor motion, and/or any other commands and sends information via transceiver 124 to navigation apparatus 102 via a transceiver of navigation apparatus 102. In some embodiments, operator control of navigation apparatus 102 is in real time, such as through a joystick, a keyboard, a touchscreen, a remote motion capture system, and/or a wearable motion capture system or other interface having similar function. In other embodiments, navigation apparatus 102 is controlled partially or wholly according to a pre-programmed routine. In further embodiments, navigation apparatus 102 is at least partially automated. In some embodiments, an operator inputs information such as operation goals or conditional directions. In further embodiments, information, such as information received by controller 116 from navigation apparatus 102, control data sent to navigation apparatus 102, and additional operator inputs or state information (e.g., location, time, orientation, datalink quality, battery levels, repair material levels, failure mode indicators), is logged into memory 128.

Moreover, in the example embodiment, controller 116 is positioned on the exterior of pipe 106 and communicates with navigation apparatus 102 positioned within interior cavity 112 of pipe 106. For example, controller 116 is configured to send information to navigation apparatus 102 relating to the propulsion and/or steering of navigation apparatus 102 while navigation apparatus 102 is moving within interior cavity 112 of pipe 106 through a wireless connection and/or tether 152. In alternative embodiments, controller 116 and navigation apparatus 102 are configured in any manner that enables system 100 to operate as described herein.

Navigation apparatus 102 includes a body 132 that is configured to fit within interior cavity 112 and travel along the length of pipe 106. Accordingly, navigation apparatus 102 facilitates inspection and/or repair of pipe 106. In the example embodiment, body 132 includes a central hub 150 and a movable core 154 coupled to the hub 150. Moreover, navigation apparatus 102 includes a drive assembly 134 coupled to body 132. Navigation apparatus 102 is self-propelled by drive assembly 134, meaning that navigation apparatus 102 moves within interior cavity 112 without external propulsion (e.g., a mechanical push or pull force) acting on navigation apparatus 102.

Drive assembly 134 includes a plurality of arm assemblies 136 extending from body 132. Each of the arm assemblies 136 includes at least two arms pivotally connected to body 132 with a wheel 138 attached to distal ends of each arm 136. Arm assemblies 136 extend at least partially radially outward from body 132 such that wheels 138 engage interior surface 110 to propel navigation apparatus 102 along pipe 106. Arm assemblies 136 position body 132 of navigation apparatus 102 centrally within pipe 106, such that a central axis of navigation apparatus 102 is generally colinear with a central axis of pipe 106. In the example embodiment, navigation apparatus 102 includes three arm assemblies 136 each having a corresponding wheel 138. In other embodiments, navigation apparatus 102 includes any suitable number of arm assemblies 136 and wheels 138.

Body 132 includes a first or "distal" end 140 and an opposed second or "proximal" end 142. During operation, for example, navigation apparatus 102 may be positioned within interior cavity 112 through an opening 144 in pipe 106, with first end 140 oriented into opening 144 and second end 142 trailing first end 140. In the illustrated embodiment, navigation apparatus 102 travels in a travel direction 146 into pipe 106 from opening 144.

In the example embodiment, a tip 137 is coupled to first end 140 of body 132. In some embodiments, tip 137 includes at least one of a sensor and/or a repair tool, and tip 137 is configured to perform a maintenance operation within pipe 104. For example, in some embodiments, tip 137 includes, without limitation, any of the following: a spray nozzle, an applicator, a drill, a grinder, a heater, a welding electrode, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, a navigation apparatus on tip 137 is used to provide information for steering navigation apparatus 102 and/or to perform a maintenance operation. In alternative embodiments, navigation apparatus 102 includes any tip 137 that enables navigation apparatus 102 to operate as described herein. For example, in some embodiments, tip 137 is shaped to engage material and displace material as navigation apparatus 102 moves through underground locations.

In addition, in some embodiments, navigation apparatus 102 includes a light source (not shown) configured to irradiate at least a portion of interior cavity 112 to facilitate visual or non-visual steering of navigation apparatus 102 and/or to allow a navigation apparatus to capture images, for example. The light source may be coupled to body assembly 134 and, in some embodiments, may be positionable relative to body assembly 134. In alternative embodiments, navigation apparatus 102 includes any light source that enables navigation apparatus 102 to operate as described herein.

In the example embodiment, tether 152 is coupled to navigation apparatus 102, proximate to or at second end 142, and extends from navigation apparatus 102 through pipe 106 and to the surface at opening 144 of pipe 106. In some embodiments, tether 152 provides at least one of power, communications, (e.g., control communications, sensor signals, video signals, etc.) and supply of a fluid for a fluid treatment to navigation apparatus 102. For example, in embodiments where tip 137 includes a spray nozzle, tether 152 may include a fluid supply line coupled in fluid communication with the spray nozzle for providing a fluid treatment to interior surface 110 of pipe 106. In other embodiments, tether 152 and a fluid supply line may be separate independent lines coupled to body 132.

Figure 2:
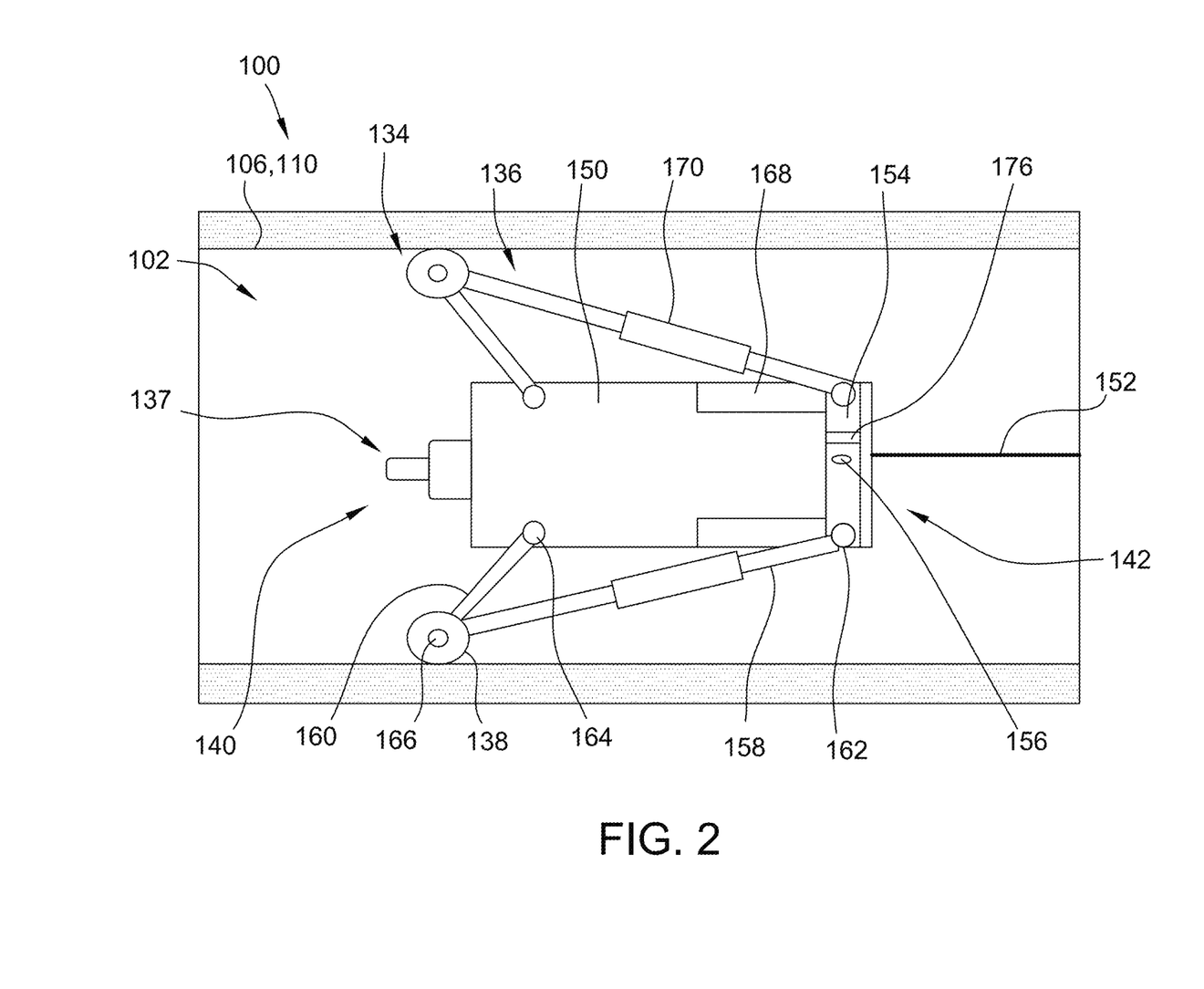
FIG. 2 is an enlarged schematic diagram of a portion of the pipe treatment system of FIG. 1 showing the navigation apparatus traveling underground in an engaged configuration.
Figure 3:
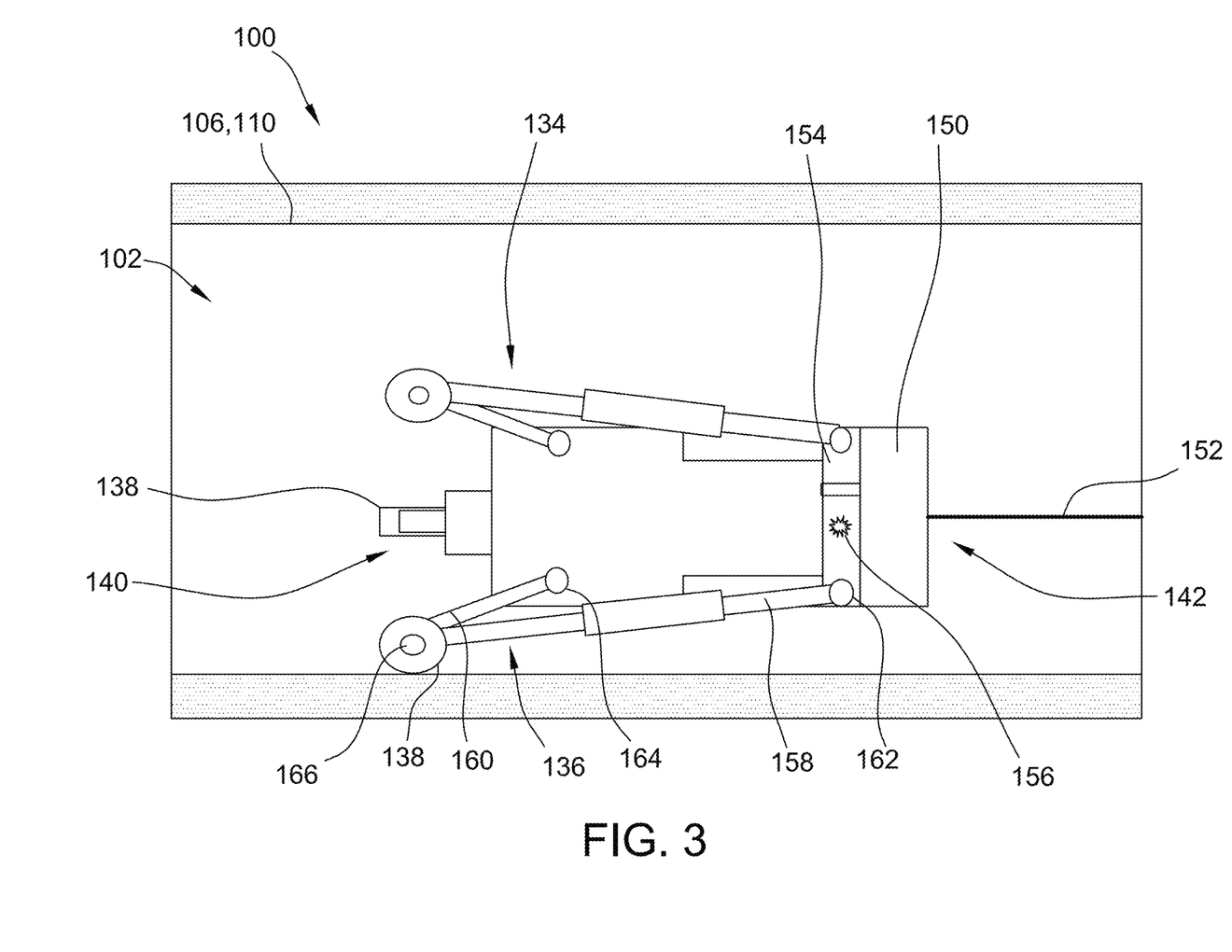
FIG. 3 is a schematic diagram of the portion of the pipe treatment system of FIG. 2 showing the navigation apparatus in a collapsed configuration.

FIG. 2 shows an enlarged view of navigation apparatus 102 in an engaged or "clamped" configuration. FIG. 3 shows navigation apparatus 102 in a collapsed configuration.

Referring to FIG. 2, in the example embodiment, movable core 154 is coupled to hub 150, at least in part, by a sacrificial connector 156. Arm assemblies 136 each include a core arm 158, alternatively referred to herein as a "first arm", and a hub arm 160, alternatively referred to herein as a "second" arm. Core arm 158 is pivotally coupled to movable core 154 by a core pivot coupling 162 and hub arm 160 is pivotally coupled to hub 150 by a hub pivot coupling 164. Hub pivot coupling 164 is positioned adjacent an opposed one of the longitudinal ends from movable core 154. In the example embodiment, movable core 154 is positioned adjacent second end 142 and hub pivot coupling 164 is positioned adjacent to first end 140. Hub arm 160 and core arm 158 are each pivotally connected to a wheel 138 by a wheel pivot coupling 166.

Additionally or alternatively, in other embodiments, a second movable core (not shown) is positioned adjacent first end 140 and second hub pivot couplings (not shown) are positioned adjacent second end 142. In such embodiments, navigation apparatus 102 includes additional arm assemblies 136 that provide wheels 138 adjacent to second end 142. In one such embodiment, navigation apparatus 102 includes six arm assemblies total, including the three arm assemblies as shown in FIG. 2, and three additional arm assemblies (not shown) arranged symmetrically to the arm assemblies 136.

In the example embodiment, drive assembly 134 includes a plurality of first motor assemblies 168 and second motor assemblies 170. First motor assemblies 168 are each coupled to central hub 150 and are operatively coupled to a corresponding core arm 158. First motor assemblies 168 are configured to drive movement of a respective core arm 158 about respective core pivot couplings 162 for positioning the respective wheels 138 in contact with wall 108 of pipe 106. In other embodiments, first motor assemblies 168 may be coupled to any other suitable component of navigation apparatus 102 that enables navigation apparatus 102 to operate as described herein. For example, and without limitation, in some embodiments, central hub 150 is formed of one or more first motor assemblies 168 that are each coupled to one another and movable core 154 is coupled directly to first motor assemblies 168.

First motor assemblies 168 may be operated to control an amount of force applied by respective wheels 138 on to wall 108 of pipe 106, and thereby adjust overall frictional forces (i.e., traction) between wheels 138 and pipe 106. In the example embodiment, first motor assemblies 168 may be controlled to operate in one of: a collapsed configuration, in which at least one of the wheels 138 is not in contact with the wall 108, and a drive configuration (alternatively a "clamped configuration"), as shown in FIG. 2, in which wheels 138 each contact wall 108 and provide sufficient traction to drive navigation apparatus 102, including any accessories, such as tether 152, being towed by navigation apparatus 102, along pipe 106.

Second motor assemblies 170 are coupled to a respective core arm 158 and are operatively coupled to wheels 138 at distal ends of the corresponding core arms 158. Second motor assemblies 170 drive rotation of the wheels 138 for driving navigation apparatus 102 along pipe. In other embodiments, second motor assemblies 170 may be coupled to any other suitable component of navigation apparatus 102 that enables navigation apparatus 102 to operate as described herein. For example, and without limitation, in some embodiments, second motor assemblies 170 may be coupled to hub arm 160.

Referring to FIG. 2, core 154 is coupled to central hub 150 by sacrificial connector 156. Sacrificial connector 156 is configured to fail under at least one of a predetermined mechanical stress, predetermined electrical stress, or other change to navigation apparatus 102. In the example embodiment, sacrificial connector 156 is a pin formed of a material that is configured to deform under a predetermined loading to decouple movable core 154 from central hub 150, thereby allowing movement of movable core 154 relative to hub 150 for collapsing drive assembly 134.

Sacrificial connector 156 extends radially (i.e., out of the page in FIG. 2) between central hub 150 and movable core 154 and connects central hub 150 and movable core 154. In some embodiments, sacrificial connector 156 may be independent from central hub 150 and movable core 154 and may be received within apertures (not shown) defined in each of central hub 150 and movable core 154 or, alternatively, sacrificial connector 156 may be integrated with at least one of central hub 150 and movable core 154.

In the example embodiment, navigation apparatus 102 further includes a safety connector 176, alternatively referred to herein as a "lockout connector," coupling movable core 154 to central hub 150. Safety connector 176 is an additional connector to sacrificial connector 156 coupling movable core 154 to central hub 150. Safety connector 176 is arranged such that, during a first operative state of safety connector 176, loading on the tether 152 and/or second end of central hub 150 is translated through safety connector 176 and not sacrificial connector 156. During a second operative state of safety connector 176, safety connector 176 is disengaged such that safety connector 176 does not couple core 154 to body 132 and loading on the tether 152 and/or second end of central hub 150 is translated through safety connector 176 and not sacrificial connector 156. In the example embodiment, safety connector 176 is maintained in the first operative state when power is provided to safety connector 176 and is configured to transition from the first operative state to the second operative state in response to a loss of power to safety connector 176 and/or navigation apparatus 102 generally. In particular, in the example embodiment, safety connector 176 includes an electromagnet (not shown) that maintains a pin (not shown) engaged against a biasing force of a biasing element (not shown), such as a spring, while power is provided to the electromagnet, thereby preventing loading of force on sacrificial connector 156. When the electromagnet loses power, the biasing element moves the pin to facilitate loading the sacrificial connector 156. In other embodiments, navigation apparatus 102 does not include a sacrificial connector 156.

During operation, navigation apparatus 102 is driven through pipe 106 in the drive configuration, with wheels 138 each exerting radially outward forces on pipe 106. In the event of a malfunction of the navigation apparatus 102 (e.g., unresponsive, loss of power, breakdown of one or more components, obstruction, etc.), drive assembly 134 is maintained in the drive configuration, thereby rendering the navigation apparatus 102 difficult to remove with the wheels 138 clamped to pipe 106. In the example embodiment, navigation apparatus 102 is configured to move to a collapsed configuration, as shown in FIG. 3, to release drive assembly 134 from engagement with pipe 106 in response to loading the tether 152 beyond the predetermined loading on the sacrificial connector 156.

For example, referring to FIG. 2, during use and in response to a malfunction, safety connector 176 is controlled to release (e.g., by ceasing power to safety connector 176) to allow for loading of the sacrificial connector 156. With safety connector 176 released, tether 152 is loaded (i.e., pulled) to break sacrificial connector 156 and collapse drive assembly 134, as shown in FIG. 3. More specifically, as wheels 138 engage pipe 106 when drive assembly 134 is in the drive configuration, during a malfunction, movement of navigation apparatus 102 from pulling of the tether 152 is resisted by engagement (i.e., frictional forces) between wheels 138 and pipe 106. Sacrificial connector 156 is arranged such that sacrificial connector 156 fails before other components of navigational apparatus 102 that receive forces translated from the tether 152.

Referring to FIG. 3, sacrificial connector 156 is shown broken. With sacrificial connector 156 broken, tension in tether 152 moves central hub 150 relative to movable core 154 such that movable core 154 is slid along central hub 150 towards first end 140 and arms 136 are collapsed inward toward central hub 150. Core arms 158 are each rotated inward about core pivot couplings 162 toward central hub 150. Hub arms 160 are each rotated about hub pivot couplings 164, such that wheel pivot couplings 166 are each moved inward towards central hub 150 and at least partially away from movable core 154. Thus, in the example embodiment, arms 136 are moved in an "umbrella type" collapse configuration in response to tension in tether 152 when sacrificial connector 156 is broken. In the collapsed configuration of FIG. 3, drive assembly 134 is not clamped against pipe 106, allowing for navigation apparatus 102 to be pulled out of pipe 106 by retracting tether 152.

The drive assembly 134 and sacrificial connector 156 allow for passively disengaging the navigation apparatus 102 from the pipe 106. That is, the navigation apparatus 102 may be disengaged from the pipe 106 mechanically from exterior of the pipe 106 by the tether 152 and without requiring the use of electrical communications with the navigation apparatus 102. As a result, the navigation apparatus 102 provides a fail safe means of disengaging the apparatus 102 in the event of any one of a loss of power to a loss of communications, a hardware malfunction of navigation apparatus 102, and/or obstruction of navigation apparatus 102.

Figure 4:
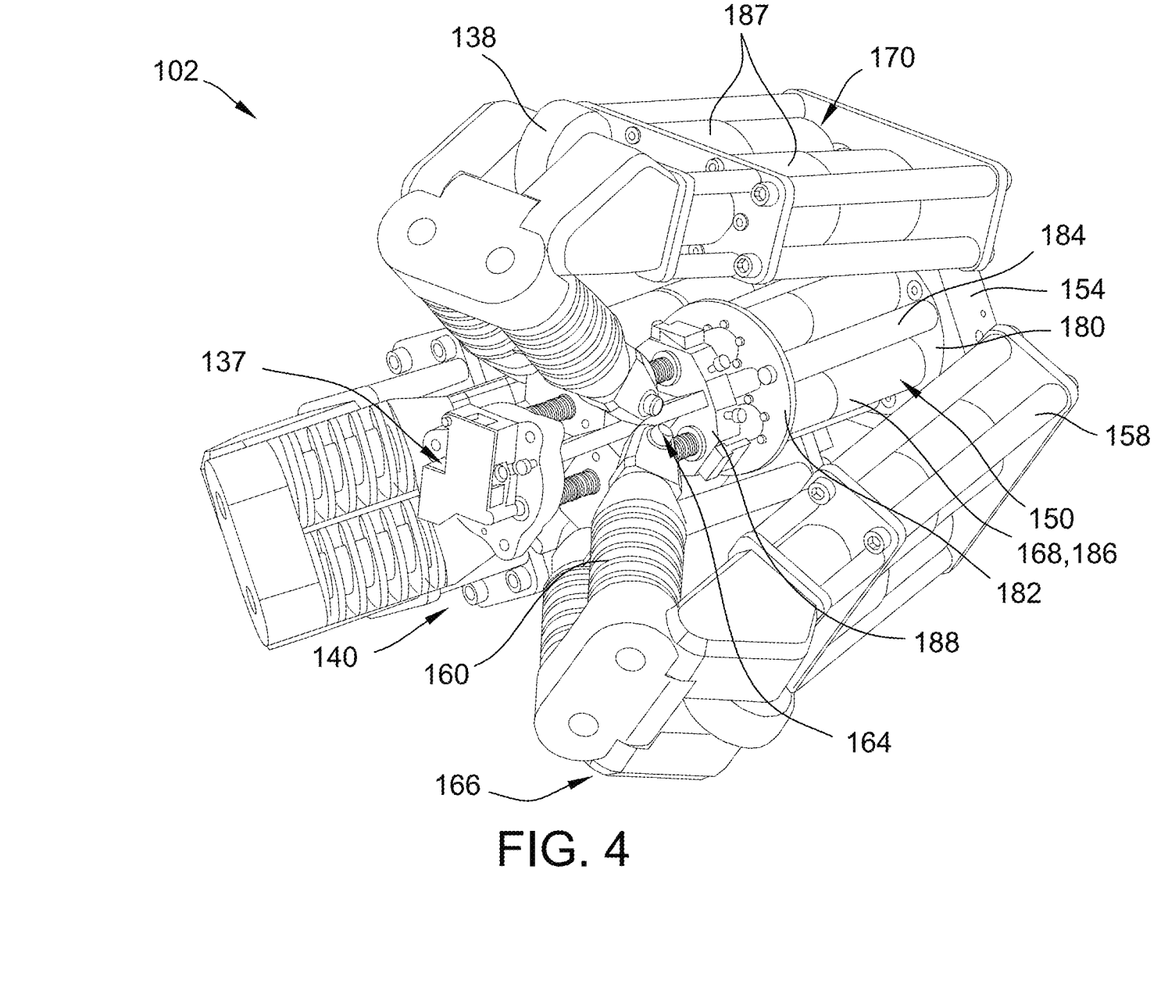
FIG. 4 is a front perspective view of a portion of the navigation apparatus shown in FIG. 1.
Figure 5:
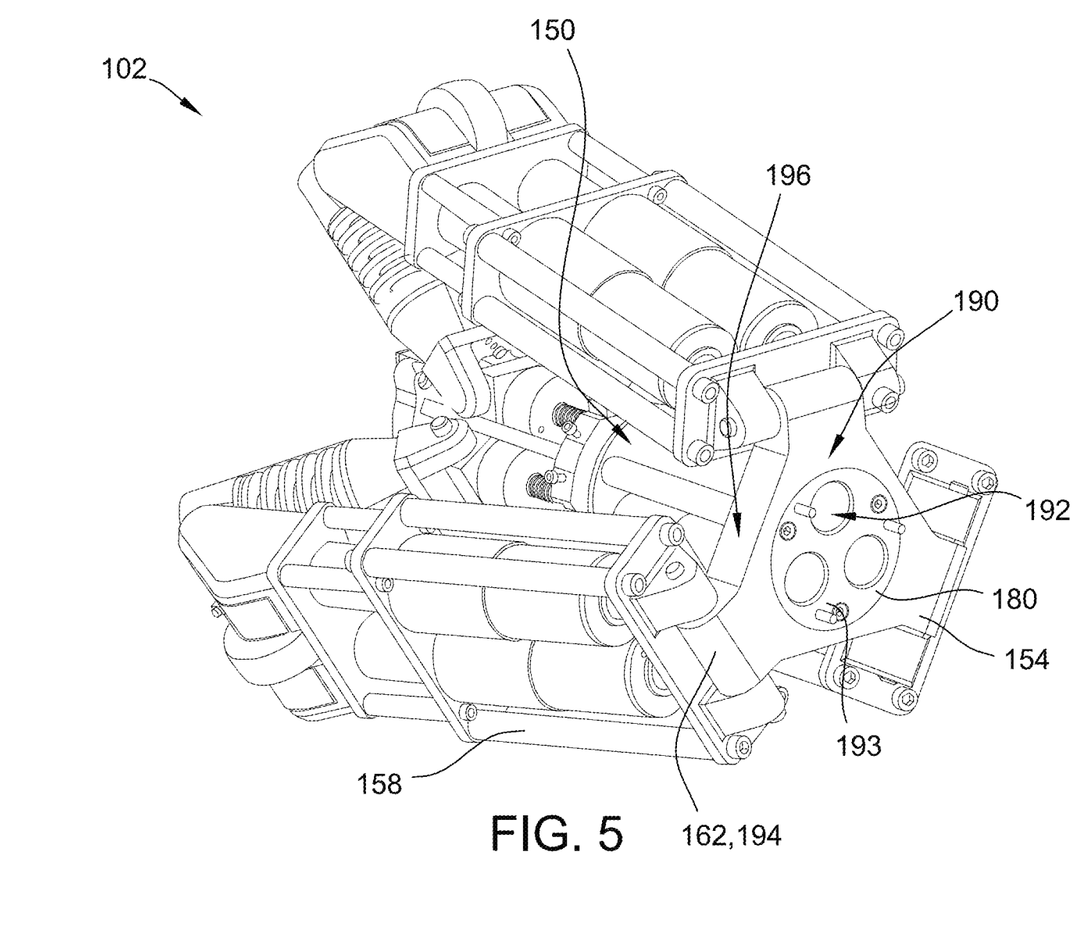
FIG. 5 is a rear perspective view of the portion of the navigation apparatus shown in FIG. 4.

FIG. 4 shows a front perspective view of navigation apparatus 102 used with pipe navigation system 100 shown in FIGS. 1-3. FIG. 5 shows a rear perspective view of navigation apparatus 102.

Referring to FIG. 4, in the example embodiment, central hub 150 includes a hub base 180 and a hub plate 182 coupled to the hub base 180 by a plurality of support bars 184. First motor assembly 168 includes a plurality of first motors 186 positioned between hub base 180 and hub plate 182. In the example embodiment, each of first motors 186 extends from hub plate 182 to hub base 180. Hub 150 includes a forward platform 188 that is positioned forward (i.e., towards first end 140) from hub plate 182. Hub arms 160 are pivotably coupled to forward platform 188 by hub pivot couplings 164. Tip 137 extends longitudinally outward from forward platform 188.

Second motor assembly 170 includes a plurality of second motors 187 positioned on a respective one of core arms 158. In the example embodiment, each second motor assembly 170 includes two second motors 187, though in other embodiments, second motor assembly 170 may include any suitable number of second motors 187 that enables navigation apparatus 102 to drive wheels 138 as described herein.

Referring to FIG. 5, in the example embodiment, hub base 180 has a cylindrical shape and is received within an annular opening 190 defined in core 154. Hub base 180 defines a plurality of apertures 192 which provide connection for wiring and/or tubing 193 from tether 152 (shown in FIG. 2) to navigation apparatus 102. In particular, in the example embodiment, tether 152 connects to hub 150 at hub base 180 and provides power and communications, via electrical wiring, and a fluid supply, via tubing, to navigation apparatus 102. Core pivot couplings 162 each include a rod 194 that extends through core arm 158 and core 154.

In the example embodiment, core 154 defines a passageway 196 therein for receiving sacrificial connector 156 (shown in FIG. 2). In particular, sacrificial connector 156 is configured to extend from a sidewall of hub base and into the passageway 196 to couple hub base 180 to core 154. When sacrificial connector 156 is broken and drive assembly 134 is collapsed, core is moved forward (i.e., to the left of the page in FIG. 5) on hub 150, such that hub base 180 protrudes rearward from core 154 and extends at least partially out of annular opening 190.

Figure 6:
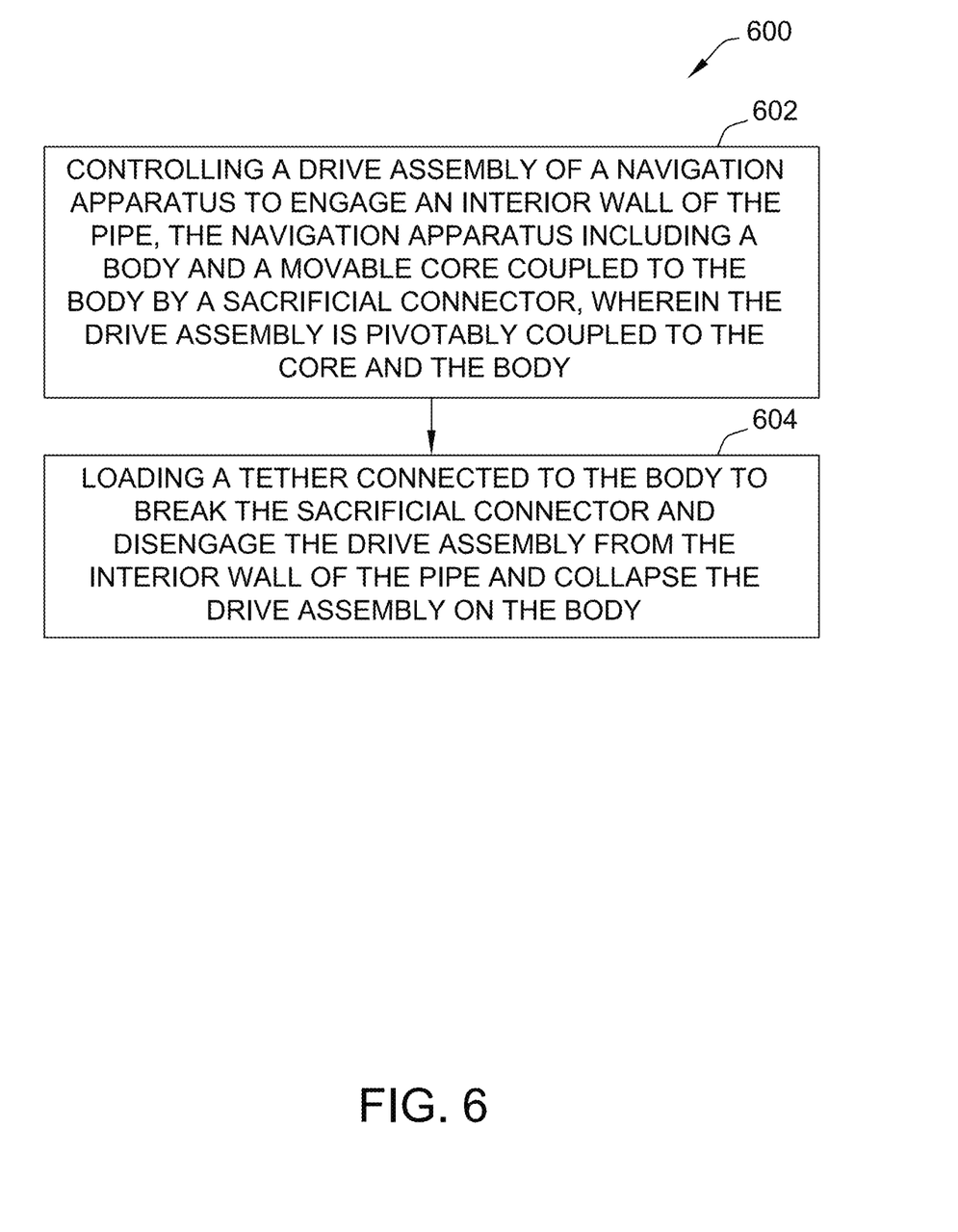
FIG. 6 is a flow chart of an example method of controlling the navigation apparatus shown in FIG. 1.

FIG. 6 is a flow chart of an example method 600 of providing a fluid treatment to a pipe 106 (shown in FIG. 1). In reference to FIGS. 1-5, method 600 includes controlling 602 a drive assembly 134 of a navigation apparatus 102 to engage an interior wall 108 of the pipe 106, the navigation apparatus 102 including a body 132 and a movable core 154 coupled to the body 132 by a sacrificial connector 156, wherein the drive assembly 134 is pivotably coupled to the core 154 and the body 132.

Also, method 600 includes loading 604 a tether 152 connected to the body 132 to break the sacrificial connector 156 and disengage the drive assembly 134 from the interior wall 108 of the pipe 106 and collapse the drive assembly 134 on the body 132.

In some embodiments method further includes controlling a safety connector 176, prior to loading the tether 152, to decouple the core 154 from the body 132.

An example technical effect of the methods, systems, and apparatus described herein includes at least one of: (a) improving ability to retriever navigation apparatus in the event of a malfunction and/or obstruction; (b) increasing traction with the pipe; (c) improving travel distance of navigation apparatus; (d) increasing load capacity of navigation apparatus, at least in part due to the increased traction; and (e) reducing costs to retrieve navigation apparatus from the pipe in the event of a malfunction and/or obstruction.

Example embodiments of systems and methods for use in pipe maintenance operations are described above in detail. The methods and systems are not limited to the specific embodiments described herein, but rather, components of systems and/or steps of the methods may be utilized independently and separately from other components and/or steps described herein. For example, the method may also be used in combination with other components, and are not limited to practice only with pipes as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A navigation apparatus for use in navigating a pipe, said navigation apparatus comprising:
   a body;
   a movable core coupled to said body by a sacrificial connector; and
   a drive assembly configured to engage an interior wall of the pipe to propel said navigation apparatus through the pipe, said drive assembly comprising a first arm, a second arm, and a wheel, wherein said first arm is pivotably coupled to said core and said wheel, and said second arm is pivotably coupled to said body and said wheel.

2. The navigation apparatus of claim 1, wherein said navigation apparatus is transitionable from an engaged configuration to a collapsed configuration by breaking said sacrificial connector, and wherein, in the engaged configuration, said drive assembly exerts an outward force on the interior wall of the pipe and, in the collapsed configuration, said core is moved relative to said body from the engaged configuration and said wheel is spaced from the interior wall of the pipe.

3. The navigation apparatus of claim 2, wherein, when transitioning from the engaged configuration to the collapsed configuration, said first arm and said second arm are pivoted inward toward said body.

4. The navigation apparatus of claim 2 further comprising a tether coupled to said body and sized to extend out of the pipe when said navigation apparatus is received within said pipe, wherein said sacrificial connector is configured to break in response to a loading on said tether when said navigation apparatus is in the engaged configuration.

5. The navigation apparatus of claim 4 further comprising:
   a first end; and
   a second end opposite said first end, wherein said wheel is positioned adjacent said first end, and said tether is coupled to said body proximate said second end.

6. The navigation apparatus of claim 4, wherein said tether is configured to provide at least one of power, communications, and a fluid for a fluid treatment to said navigation apparatus.

7. The navigation apparatus of claim 1, wherein said drive assembly comprises a first motor assembly and a second motor assembly, said first motor assembly configured to rotate said first arm on said core, and said second motor assembly configured to drive said wheel.

8. The navigation apparatus of claim 1, wherein said sacrificial connector comprises a pin extending radially outward from said body to said core.

9. The navigation apparatus of claim 1 further comprising a safety connector, said safety connector transitionable from a first operative state, in which said safety connector couples said movable core to said body, to a second operative state, in which said safety connector is disengaged from at least one of said core and said body.

10. The navigation apparatus of claim 9, wherein said safety connector is configured to passively transition from the first operative state to the second operative state in response to a loss of power to said safety connector.

11. The navigation apparatus of claim 9 further comprising a tether coupled to said body and sized to extend out of the pipe when said navigation apparatus is received within said pipe, wherein said sacrificial connector is configured to break in response to a loading on said tether when said navigation apparatus is in the engaged configuration and said safety connector is in the second operative state, and wherein the loading is directed to said safety connector when said safety connector is in the first operative state.

12. A pipe navigation system for use in navigating a pipe comprising:
   a tether; and
   a pipe navigation apparatus comprising:
      a body, wherein said tether is coupled to said body;
      a movable core coupled to said body by a sacrificial connector; and
      a drive assembly pivotably coupled to said body and said movable core, said drive assembly configured to engage an interior wall of the pipe to propel said navigation apparatus through the pipe, wherein said sacrificial connector is configured to break in response to a loading on said tether to disengage said drive assembly from the interior wall and collapse said drive assembly on said body.

13. The pipe navigation system of claim 12, wherein said drive assembly comprises a first arm pivotably coupled to said core, a second arm pivotably coupled to said body, and a wheel pivotably coupled to said first arm and said second arm.

14. The pipe navigation system of claim 13, wherein said first arm and said second arm are configured to pivot inward toward said body when said drive assembly is collapsed.

15. The pipe navigation system claim 13, wherein said drive assembly comprises a first motor assembly and a second motor assembly, said first motor assembly configured to rotate said first arm on said core, and said second motor assembly configured to drive said wheel.

16. The pipe navigation system of claim 12, wherein said tether is configured to provide at least one of power, communications, and a fluid for a fluid treatment to said navigation apparatus.

17. The pipe navigation system of claim 12, where said navigation apparatus further comprises a safety connector, said safety connector transitionable from a first operative state, in which said safety connector couples said movable core to said body, to a second operative state, in which said safety connector is disengaged from at least one of said core and said body and wherein said safety connector passively transitions from the first operative state to the second operative state in response to a loss of power to said safety connector.

18. A method for controlling a navigation apparatus in a pipe, said method comprising:
   controlling a drive assembly of a navigation apparatus to engage an interior wall of the pipe, the navigation apparatus including a body and a movable core coupled to the body by a sacrificial connector, wherein the drive assembly is pivotably coupled to the core and the body; and
   loading a tether connected to the body to break the sacrificial connector and disengage the drive assembly from the interior wall of the pipe, and collapse the drive assembly on the body.

19. The method of claim 18, wherein the drive assembly includes a first arm pivotably coupled to the core, a second arm pivotably coupled to the body, and a wheel pivotably coupled to the first arm and the second arm.

20. The method of claim 19, wherein the first arm and the second arm pivot inward toward the body when the drive assembly is collapsed.

\* \* \* \* \*